(12) United States Patent
Kesse et al.

(10) Patent No.: US 8,209,963 B2
(45) Date of Patent: Jul. 3, 2012

(54) INTEGRATED ENGINE AND EXHAUST AFTER TREATMENT SYSTEM AND METHOD OF OPERATING SAME

(75) Inventors: Mary L. Kesse, Hanna City, IL (US); Wade D. Scrivner, Washington, IL (US); Amit Jayachandran, Peoria, IL (US); Liangtao Zhu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 963 days.

(21) Appl. No.: 12/154,064

(22) Filed: May 20, 2008

(65) Prior Publication Data

US 2009/0288394 A1    Nov. 26, 2009

(51) Int. Cl.
*F01N 3/00* (2006.01)
*F01N 3/10* (2006.01)

(52) U.S. Cl. .................. 60/295; 60/286; 60/301

(58) Field of Classification Search .......... 60/274, 60/276, 286, 295, 301, 303
See application file for complete search history.

(56) References Cited

U.S. PATENT DOCUMENTS

| | | | | |
|---|---|---|---|---|
| 5,414,994 | A * | 5/1995 | Cullen et al. | 60/274 |
| 6,427,439 | B1 * | 8/2002 | Xu et al. | 60/286 |
| 6,882,929 | B2 | 4/2005 | Liang et al. | |
| 6,981,368 | B2 * | 1/2006 | van Nieuwstadt et al. | 60/277 |
| 7,861,517 | B2 * | 1/2011 | Goulette et al. | 60/286 |
| 7,861,518 | B2 * | 1/2011 | Federle | 60/286 |
| 2004/0126286 | A1 | 7/2004 | deRuyter | |
| 2005/0282285 | A1 | 12/2005 | Radhamohan et al. | |
| 2007/0042495 | A1 * | 2/2007 | Pavlova-MacKinnon et al. | 436/55 |
| 2007/0251218 | A1 | 11/2007 | Driscoll et al. | |
| 2008/0202097 | A1 * | 8/2008 | Driscoll et al. | 60/274 |
| 2008/0264036 | A1 * | 10/2008 | Bellovary | 60/274 |
| 2010/0058740 | A1 * | 3/2010 | Kurtz | 60/286 |
| 2010/0122524 | A1 * | 5/2010 | Solbrig | 60/285 |

FOREIGN PATENT DOCUMENTS

JP        2006274844 A  * 10/2006
WO   WO 2008009940 A2 *  1/2008

* cited by examiner

*Primary Examiner* — Thomas Denion
*Assistant Examiner* — Audrey K Bradley
(74) *Attorney, Agent, or Firm* — Liell & McNeil

(57) ABSTRACT

An engine system includes an integrated engine and aftertreatment control system via an electronic aftertreatment controller that is in communication with the electronic engine controller. An aftertreatment control algorithm is operable to generate an exhaust control signal and a reductant dosing control signal. The dosing control signal is used to control a flow rate of a reductant (e.g. urea) injection rate into the exhaust system for facilitating a reduction reaction with NOx in the exhaust flow at a suitable downstream catalyst location. The exhaust control signal is communicated to the electronic engine controller, which responds by altering engine operation to change some aspect of the engine exhaust. In one specific example, an ammonia slip event precondition is detected by the electronic aftertreatment controller, and an exhaust control signal in the form of an increase NOx request is communicated to the engine controller, which responds by altering engine operation to increase NOx output in the hopes of preempting the expected ammonia slip event prior to its actual occurrence to maintain undesirable emissions low at the tailpipe.

1 Claim, 2 Drawing Sheets

INTEGRATED ENGINE AND EXHAUST AFTER TREATMENT SYSTEM AND METHOD OF OPERATING SAME

TECHNICAL FIELD

The present disclosure relates generally to engine systems that include an electronically controlled engine coupled to an electronically controlled aftertreatment system, and more particularly to controlling an engine responsive to an exhaust control signal originating from an electronic aftertreatment controller.

BACKGROUND

In an effort to reduce undesirable emissions being vented from a tailpipe connected to an engine exhaust outlet, a reduction catalyst may be positioned in the exhaust passage to promote conversion of NOx into more desirable gas species including nitrogen, carbon dioxide and water. For instance, in the case of some compression ignition engines, a reductant injection nozzle is positioned in the exhaust passage upstream from the reductant catalyst in order to mix an added reductant with exhaust gases before arrival at the catalyst where a reduction reaction occurs. Some engine systems utilize a urea injection system to provide the necessary chemical elements that combine with exhaust gases and react on the surface of a reduction catalyst to convert undesirable NOx emissions into more desirable gas species prior to exiting the engine system at the tailpipe. In more sophisticated engine systems, a dedicated electronic aftertreatment controller utilizes a variety of sensors to detect the state of the exhaust flow, and respond to that sensed state with urea dosing control signals to improve equilibrium of the reduction reaction. For instance, the electronic aftertreatment controller may determine exhaust mass flow rate as well as the percentage of the NOx in the exhaust flow, and provide a urea dosing control signal to match the injected reductant mass quantity of the NOx mass flow rate to supposedly arrive at an equilibrium reduction reaction that effectively converts all of the NOx and reductant to more desirable gases leaving at the tailpipe. In one example, U.S. Patent publication 2005/0282285 teaches a method of controlling an ammonia feed rate to a selected catalytic reduction reactor using a NOx sensor cross sensitive to ammonia.

While steady state reductant dosing control has proven somewhat effective, those skilled in the art appreciate that engine operating states are often changing, resulting in quick changes in exhaust mass flow rate, the percentage of NOx in the exhaust flow, and maybe more importantly temperature fluctuations in the exhaust flow. Because the reduction reaction is generally sensitive to temperature, the quality of the reduction reaction can change rapidly, sometimes resulting in an outgas slip event. If excess reductant or urea is present, a so called ammonia slip event might occur. On the otherhand, if insufficient reductant is present or the reduction reaction has been repressed, a NOx slip event might occur. Out gas slip events are undesirable and generally cannot be undone after having occurred.

The present disclosure is directed to one or more of the problems set forth above.

SUMMARY

In one aspect, an engine system includes an electronically controlled engine with a plurality of electrical actuators in communication with an electronic engine controller. An exhaust aftertreatment system is fluidly connected to an exhaust outlet from the electronically controlled engine, and includes an electronically controlled reductant delivery system in communication with an electronic aftertreatment controller. The electronic aftertreatment controller is in communication with the electronic engine controller. The electronic engine controller is operable to control the plurality of electrical actuators responsive to an exhaust control signal from the electronic aftertreatment controller.

In another aspect, an integrated engine and aftertreatment control system includes an engine control algorithm resident in an electronic engine controller. An aftertreatment control algorithm is resident in an electronic aftertreatment controller. The electronic aftertreatment controller is in communication with the electronic engine controller. The aftertreatment control algorithm is operable to generate an exhaust control signal and a reductant dosing control signal. The engine control algorithm is operable to generate an engine control signal responsive to the exhaust control signal.

In still another aspect, a method of operating an engine system includes supplying exhaust from the engine to an aftertreatment system. Undesirable emissions are reduced in the aftertreatment system by controlling a reductant reaction between NOx and a reductant. The controlling is accomplished by adjusting a reductant delivery system and communicating an exhaust control signal to an electronic engine controller. The engine operation is adjusted responsive to the exhaust control signal.

DETAILED DESCRIPTION

Figure 1:
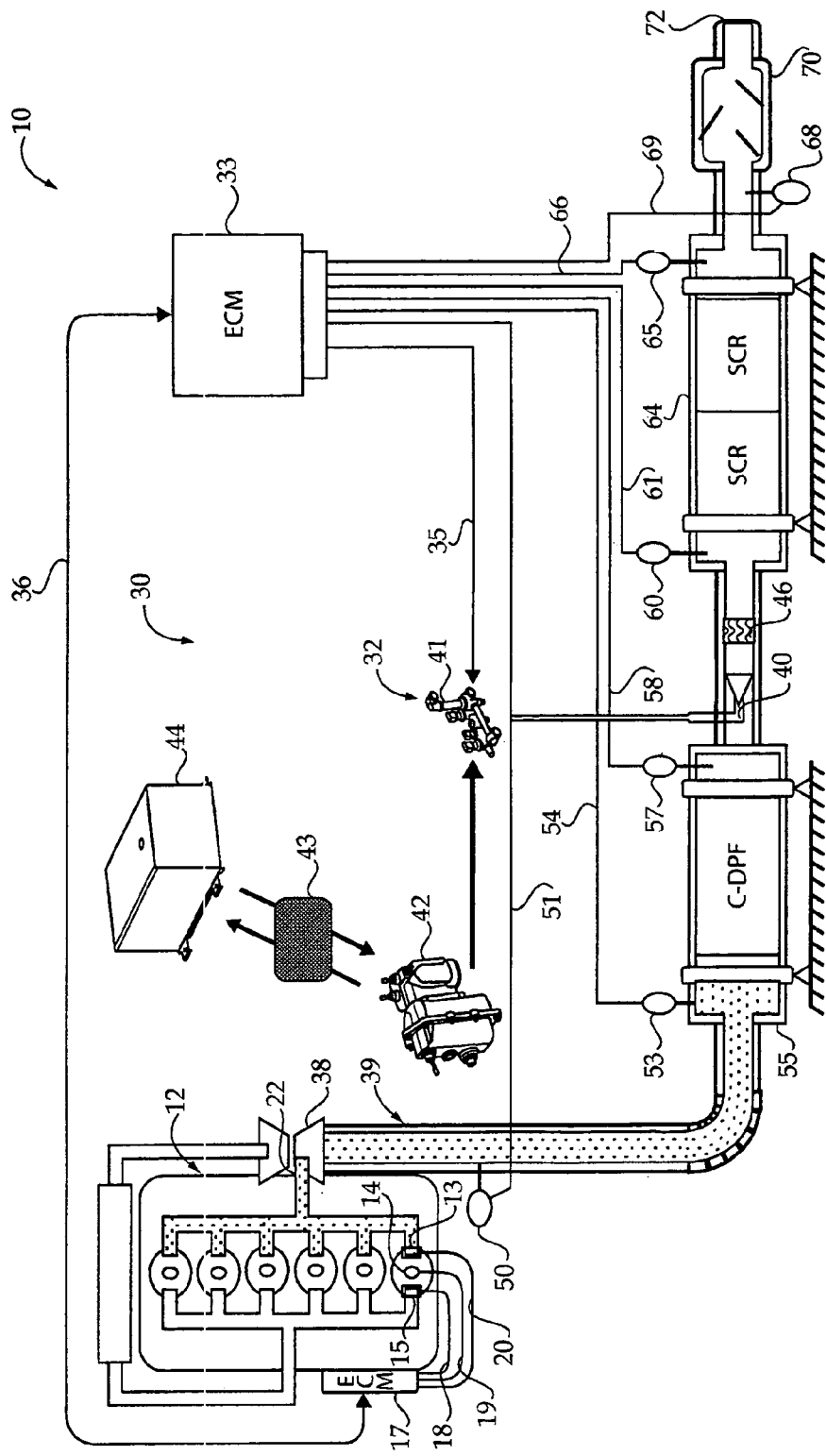
FIG. 1 is a schematic illustration of an engine system according to one aspect of the present disclosure.

Referring to FIG. 1, an example engine system 10 according to the present disclosure is illustrated in the context of a six cylinder electronically controlled compression ignition engine 12 and an electronically controlled exhaust aftertreatment system 30. Electronically controlled engine 12 includes an electronic engine controller 17 in control communication with a plurality of electrical actuators that control the operation of the engine in a known manner. In other words, an electronic engine control algorithm is resident in the electronic engine controller 17 and provides control signals to a variety of electrical actuators, such as fuel injectors 14 via individual communication lines 19, only one of which is shown. Thus, electronic engine controller 17 can send the same or different fuel injection control signals to the relevant actuators of the fuel injectors 14 associated with each individual engine cylinder to cause one or more desired injection events according to the engine control algorithm. Although not necessary, engine 12 may also be equipped with electrical exhaust valve actuators 13 in communication with electronic controller 17 via communication line 20 (only one of which is shown) and may also include electronically controlled intake valve actuators 15 in communication with an electronic engine controller 17 via communication lines 18 (again only one of which is shown). Engine 12 includes an exhaust outlet 22 that is connected to the exhaust passage 39 of exhaust aftertreatment system 30. Although engine 12 is illustrated as a six cylinder compression ignition engine, those skilled in the art will appreciate that the teachings of the present disclosure are also applicable to other types of engines, included spark ignited engines, and is also equally applicable to engines having a different number of engine cylinders. In many instances, the engine control algorithm resident in the electronic engine controller 17 may include strategies for controlling the operation of engine 12 in such a way to produce some desired compromise between performance and reduced emissions. Undesirable emissions can generally be categorized as NOx, unburned hydrocarbons and particulate matter. The exhaust aftertreatment system 30 is generally designed to reduce these undesirable emissions prior to the exhaust exiting tailpipe 72.

The exhaust aftertreatment system 30 includes an electronically controlled reductant delivery system 32 in communication with an electronic aftertreatment controller 33 via a communication line 35. An engine out NOx sensor 50 may be located near exhaust outlet 22, such as downstream from a turbocharger 38 as shown. Engine out NOx sensor 50 provides electronic aftertreatment controller 33 with information with regard to the NOx concentration of exhaust passing the sensor 50 via communication line 51. Electronic aftertreatment controller 33 utilizes this information and other information, such as exhaust mass flow rate, in its resident aftertreatment control algorithm to communicate a reductant delivery control signal to a dosing control device 41 that controls the flow rate of reductant into exhaust passage 39 via a reductant nozzle 40, which may be located downstream from a particulate filter 55. Particulate filter 55 maybe a diesel particulate filter that may or may not be coated with suitable catalyst to help promote oxidation of particulate matter that becomes trapped in particulate filter 55 during normal operation of engine 12. Exhaust aftertreatment system 30 may include a temperature sensor 53 located adjacent the inlet to particulate filter 55, and a second temperature sensor 57 located adjacent the outlet of particulate filter 55 that communicates exhaust temperatures to aftertreatment controller 33 via respective communication lines 54 and 58. In order to promote mixing of injected reductant, which may be urea or another suitable reductant such as ammonia, a mixer pipe 46 may be located at a suitable location downstream from nozzle 40 to promote mixing of the injected reductant with the exhaust gases. After passing through mixer pipe 46, the mixture of reductant and exhaust gas passes a temperature sensor 60 located adjacent the upstream portion of a reducing catalyst 64, and communicates that temperature information to electronic aftertreatment controller 33 via a communication line 61. Catalyst 64 is of a conventional construction and includes a catalyst substance that promotes a reduction reaction between NOx and the reductant (ammonia) to result in more desirable emission gases that includes nitrogen and water vapor. Still another temperature sensor 65 may be located adjacent the outlet from catalyst 64 and communicate post reduction reaction temperature of the treated exhaust gases to electronic aftertreatment controller 33 via communication line 66. Electronic aftertreatment controller 33 may monitor the post reduction reaction NOx level in the treated exhaust via an SCR out NOx sensor 68 that communicates NOx concentration information to aftertreatment controller 33 via a communication line 69. After passing SCR out NOx sensor 68, the treated exhaust gases may pass through a muffler 70 prior to being vented to atmosphere via tailpipe 72.

The electronically controlled reductant delivery system 32 may include a tank 44, a filter 43 and a pump 42 in a conventional manner. Electronic aftertreatment controller 33 communicates with electronic engine controller 17 via a communication line 36. For instance, electronic engine controller 17 may communicate information necessary for electronic aftertreatment controller to determine an exhaust gas mass flow rate on an ongoing basis. In addition, the present disclosure also contemplates the electronic aftertreatment controller 33 not only generating dosing control signals for dosing control device 41, but also generating an exhaust control signal that may be communicated to electronic engine controller 17 via communication line 36. This exhaust control signal may take the form of a NOx adjustment signal that would be interpreted by the engine control algorithm to alter engine operation to change the exhaust constituents as per the request from the electronic aftertreatment controller 33. For instance, the engine control algorithm may have a hierarchical logic structure where a power output of the engine may be maintained, but the fuel injection control signals may be altered in a way to maintain power output but change exhaust constituents leaving engine outlet 22. If electronic aftertreatment controller 33 were to provide an exhaust control signal that constituted a request to increase NOx, the electronic engine controller 17 could respond by changing an injection sequence profile to maintain power levels but induce higher temperature burning characteristics typical of increased NOx production in order to be responsive to the exhaust control signal originating with the electronic aftertreatment system 30. Thus, in the engine system 10 according to the present disclosure, the aftertreatment controller 33 not only responds to the output from engine 12 by adjusting a dosing control signal, but also exercises some control over emissions via exhaust control signals that are communicated to the engine controller 17 and acted upon to alter the engine operation to change the exhaust mixture being outputted from engine 12.

Those skilled in the art should appreciate that the described sensors and their respective locations in exhaust passage 39 are exemplary only for describing one aspect of the disclosure, which relates to identifying an ammonia slip precondition and having sufficient time to act upon it by changing engine operation to preempt the same prior to an outgas slip event at tailpipe 32. In other words, those skilled in the art will appreciate that detecting a NOx or ammonia slip event downstream from catalyst 64 may provide useful information, but may not provide enough time to act upon, at least in regard to changing engine operation to address an outgas slip event that has already progressed beyond the aftertreatment devices. The present disclosure also recognizes that if an ammonia slip precondition (described later) is detected in time to act upon, the engine operation can be altered to maybe increase NOx output sufficiently to cancel the anticipated surplus of ammonia, and thus preempt or avoid an ammonia slip event. Those skilled in the art will appreciate that no urea dosing control signal can remedy a situation where a surplus of reductant already exists in the exhaust passage 39. Although the present disclosure has been illustrated with an engine system 10 having four temperature sensors and two NOx sensors, those skilled in the art will appreciate that additional NOx and temperature sensors at alternate locations could be utilized, and other relevant sensors could be utilized for sensing aftertreatment conditions that might be reduced or abated via suitable changes in engine operation.

Industrial Applicability

The present disclosure finds potential application in any engine system that includes an electronically controlled engine coupled to an electronically controlled exhaust aftertreatment system. The present disclosure find particular application to compression ignition engine systems that include a reduction catalyst for reacting a reductant with NOx to convert the same into more desirable gases prior to being vented to atmosphere at a tailpipe. The present disclosure is also further particularly applicable to such systems in which a urea or another reductant dosing system is configured for injecting a reductant into the exhaust flow upstream of a reduction catalyst. Nevertheless, those skilled in the art will appreciate that other electronically aftertreatment control strategies either known or to be discovered could be compatible with the present disclosure in which that aftertreatment control could be improved or supplemented by requesting engine operation changes to assist in addressing changing conditions in the exhaust system.

Those skilled in the art will appreciate that a somewhat conventional engine control algorithm is resident on the electronic engine controller 17 with programming and maps and the like for responding to and executing speed and load commands that may be originating from an operator. Generally, these programming instructions will be previously prepared and stored for use by the electronic engine controller as per some previously arrived at compromise between engine performance and output emissions, among other considerations. Both the electronic engine controller 17 and the electronic aftertreatment controller 33 may be a conventional electronic control module of standard design and generally including a processor, such as for example, a central processing unit, a memory, and an input/output circuit that facilitates communication internal and external to the controller. The central processing unit controls operation of the electronic control module by executing operating instructions, such as, programming codes stored in memory, wherein operations may be initiated internally or externally to the electronic control module. A control scheme may be utilized that monitors outputs of systems or devices, such as for example the illustrated sensors, actuators or other control units via the input/output circuit to control inputs to various other systems or devices. The memory may comprise temporary storage areas, such as for example, cache, virtual memory, random access memory, or permanent storage areas, such as for example, read only memory, removable drives, network/internet storage, hard drive, flash memory, memory sticks or any other known volatile or non-volatile data storage devices located internally or externally to the electronic control module. One skilled in the art will appreciate that any computer based system utilizing similar components would be suitable for use with the present disclosure.

The electronic aftertreatment controller 33 may be configured to include an aftertreatment control algorithm that is resident on electronic aftertreatment controller 33. This algorithm may typically utilize information from engine out NOx sensor 50 to determine dosing control signals for adjusting the reductant delivery system 32 to adjust a reduction reaction on an ongoing bases at reduction catalyst 64 in a conventional manner. For instance, the electronic aftertreatment controller 33 may receive exhaust mass flow rate information from engine controller 17 and combine that information with engine NOx sensor data originating from sensor 50 to arrive at an estimate of the NOx mass flow rate in exhaust passage 39 at any given time. This information combined may then be utilized to cause a reductant mass flow rate at reductant nozzle 40 to match the molecular count of NOx present in order to consume all of the reductant and NOx in an equilibrium reduction reaction at catalyst 64. In addition, this control function may have any suitable level of sophistication including but not limited to taking into account the delay times between when a condition is sensed verses when it can be acted upon downstream in exhaust passage 39.

Figure 2:
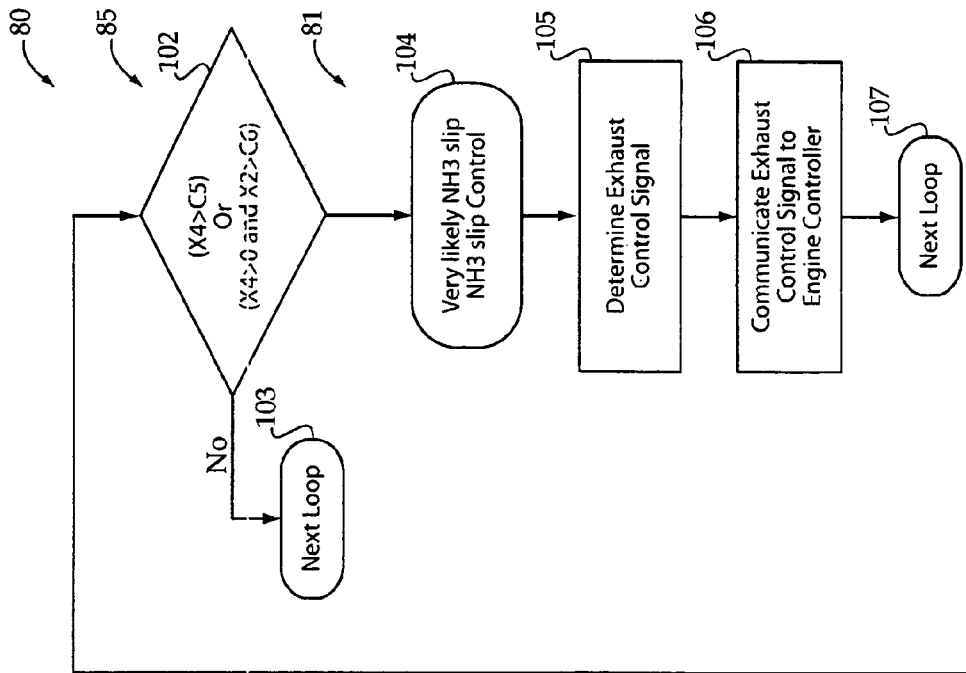
FIG. 2 is a logic flow diagram for an outgas slip event pre-condition detection algorithm that is a portion of an aftertreatment control algorithm executed by an electronic aftertreatment controller.
Figure 2:
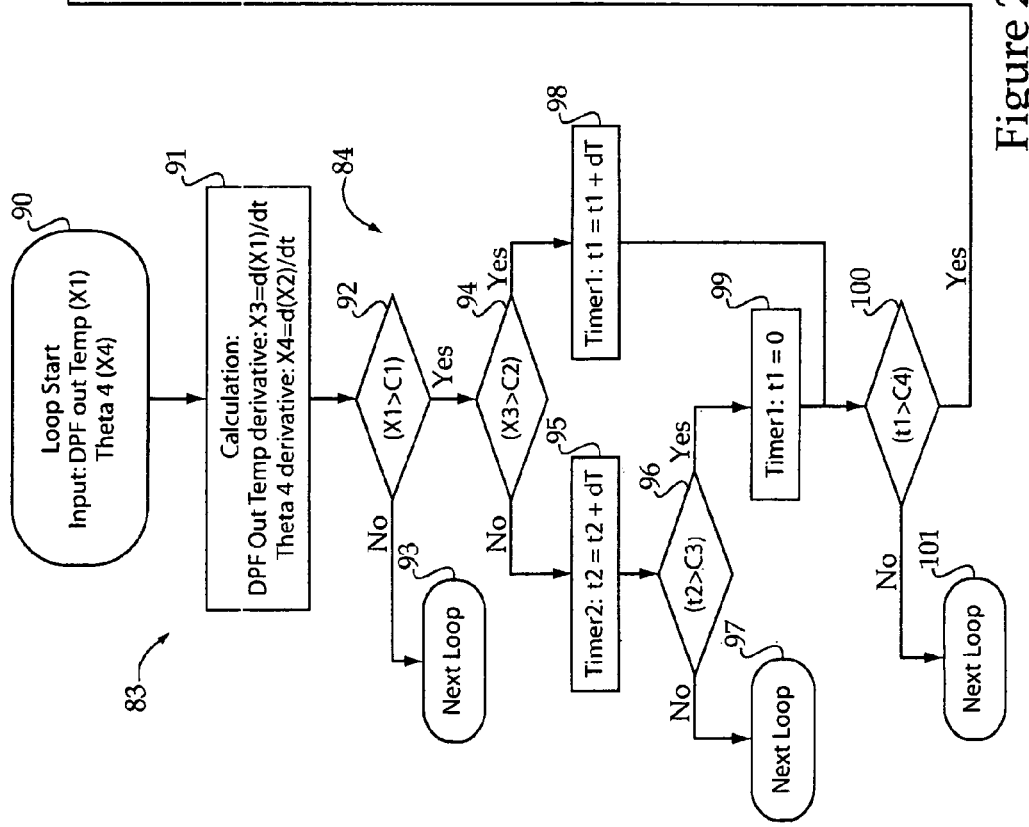

Referring now to FIG. 2, the aftertreatment control algorithm 80 may include, in addition to the previous discussed control algorithm for the reductant delivery system 32, an outgas slip event precondition detection algorithm 81, which includes a temperature monitoring algorithm 84 and a catalyst state monitoring algorithm 85. These algorithms are utilized by the electronic aftertreatment controller 33 to identify an outgas slip event precondition in sufficient time to act to alleviate the expected outgas slip event prior to any undesirable emissions being emitted from tailpipe 72. The illustrated algorithms specifically are designed as one way of identifying an ammonia outgas slip event precondition, determining what engine operation adjustment could be made to alleviate the expected outgas slip event, and then altering engine operation in response to a exhaust control signal communicated to an engine controller 17 that originates in the electronic aftertreatment controller 33. The aftertreatment control algorithm 80 accomplishes this task by determining whether the temperature at or upstream from injection nozzle 40 is greater than some threshold, and whether the time rate of change of that temperature has exceeded another threshold for a sufficient period of time. In addition, this task is accomplished by estimating whether a time rate of change of reductant concentration on catalyst 64 has exceeded some threshold, or in the alternative, whether the time rate of change in reductant concentration is greater than zero and the estimated concentration, especially for the downstream end a catalyst 64 (Theta 4), has exceeded still another threshold. If these conditions are satisfied, the electronic aftertreatment controller 33 will identify those conditions as indicating a reductant slip event precondition. The various thresholds may be calibrated and predetermined prior to storage in memory available to the electronic aftertreatment controller 33.

The logic flow for executing the outgas slip event precondition detection algorithm 81 is illustrated in FIG. 2 and begins at read data block 90 with a determination of exhaust gas temperature from the particulate filter outlet temperature sensor 57 which is identified in the flow chart as variable X1. In read data block 90 a reductant concentration X2 is also determined, which corresponds to the concentration of reductant on catalyst 64, especially the reductant concentration in the last quarter or theta four section of the catalyst 64. Those skilled in the art will appreciate that the catalyst can be hypothetically divided into any number of consecutive segments, or not at all, and instead utilize an average concentration over the entire catalyst for performing the strategy of the present disclosure. The estimated concentration of the reductant at any point on the catalyst 64 may be estimated using known techniques that include taking into consideration previous reductant delivery control signals, temperature at upstream point 60 and downstream point 65 with regard to catalyst 64 as well as other information including but not limited to exhaust mass flow rate using known techniques. This aspect of the present disclosure can have various levels of sophistication extending from crude estimates to actual measurements without deviating from the intended scope of the present disclosure. At calculation block 91, the time rate of change of the temperature reading at sensor 57 (X1) is calculated and identified as variable X3. In addition, in calculation block 91 the time rate of change of the reductant concentration at the Theta 4 downstream quadrant of catalyst 64 (X2) is determined and identified as variable X4. At query 92, the algorithm 81 determines whether the outlet temperature X1 is greater than a first predetermined calibrated threshold C1. If not, the logic flows to loop back 93 and determines that no ammonia slip event pre-condition yet exists. The term "loopback" means that the logic flow returns to the original read data block 90 and begins executing the logic again. If the outlet temperature X1 does exceed the threshold C1, the logic advances to query 94 where an evaluation of whether the time rate of change of the outlet temperature X3 (dX1/dt) has exceeded a second threshold C2. If this condition has been met, the logic advances to timer increment block 98 where a timer T1 is incremented by a time increment DT which may correspond to the clock interval time for the central processing unit at the heart of electronic aftertreatment controller 33. Next, the logic advances to query 100 where it determines whether that accumulated time T1 has exceeded a fourth threshold C4. If not, the logic loops back at 101 to again read data and begin the logic flow again. Returning to query 94, if the time derivative of the outlet temperature X3 is not greater than threshold C2, the logic advances to a second timer increment block 95 where a timer T2 is incremented by the interval DT. Next, at query 96, if that accumulated time T2 has exceeded a third threshold C3 the logic advances to timer reset block 99 where the timer T1 is reset to zero. If time T2 is less than threshold C3, the logic loops back again at step 97. If T2 is greater than threshold C3, the logic resets T1 to zero at block 99. Returning to query 100, if time T1 is greater than a threshold time C4, reflecting that the outlet temperature derivative X3 has exceeded threshold C2 for a time duration that exceeds threshold C4, the logic advances to query 102. At query 102, if the reductant concentration derivative X4 exceeds a fifth threshold C5, or the reductant concentration derivative X4 is positive and the reduction concentration X2 exceeds a sixth threshold C6. If not, the logic loops back at block 103. If this condition is also met, an outgas slip precondition detection block 104 determines that an ammonia slip event precondition has been satisfied and a slip event will likely occur without corrective action. Next, at block 105, an exhaust control signal is determined. For instance, this exhaust control signal may generally take the form of a request for increased NOx from engine 12 in a magnitude and duration sufficient to counteract the suspected magnitude of the otherwise expected ammonia slip event. For instance, if the ammonia slip event magnitude is expected to be small, the NOx increase request may likewise be to increase NOx output for a brief duration in order to provide an estimated molecule for molecule match to consume the excess ammonia at catalyst 64 with excess NOx produced by the engine prior to an ammonia slip event actually occurring at tailpipe 72. Next at block 106, the exhaust control signal is communicated from electronic aftertreatment controller 33 to electronic engine controller 17 via communication line 36. In the case of a NOx increase request, the engine may respond simply by injecting a similar amount of fuel, but doing so in a different sequence and/or timing to maintain power output requirements from the engine 12 but increases combustion temperature to briefly increase NOx output commensurate with the exhaust control signal. When this occurs, the expectation is for the excess NOx to arrive at catalyst 64 to consume the excess ammonia prior to an ammonia slip event occurring and traveling toward tailpipe 72. Loop back step 107 causes the logic flow to continually repeat, thereby providing continual adjustment of the communication to the engine controller 17 based on changing conditions.

Those skilled in the art will appreciate that the various calibration thresholds C1-C6 can be determined based upon simulation data and/or actual measurements made while operating engine system 10 under various conditions. In addition, these calibration thresholds, C1-C6 can be set with some desired level of aggressiveness in addressing potential ammonia slip or other outgas slip event criteria. An engine system 10 according to the present disclosure has the advantage of having a strategy to identify an outgas event precondition and act upon it with engine operation changes in sufficient time that the expected slip event is either abated or reduced before reaching tailpipe 72. Although the specific combination of temperature data and reductant concentration data as well as their derivatives were utilized to ascertain an ammonia slip event pre-condition, those skilled in the art will appreciate that there are likely other combinations of tests and data that could also be utilized in predicting an undesirable event in advance, which might be remedied via appropriate action in altering engine operation to alleviate the undesirable condition prior to undesirable emissions being vented to atmosphere. These alternative strategies also fall within the intended scope of the present disclosure.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine system comprising:
    an electronically controlled engine including a plurality of electrical actuators in communication with an electronic engine controller;
    an exhaust aftertreatment system fluidly connected to an exhaust outlet from the electronically controlled engine, and including an electronically controlled reductant delivery system in communication with an electronic aftertreatment controller;
    the electronic aftertreatment controller being in communication with the electronic engine controller;
    the electronic engine controller being operable to control the plurality of electrical actuators responsive to an exhaust control signal from the electronic aftertreatment controller;
    the exhaust control signal is based at least in part on a time rate of change of a temperature of engine exhaust in the exhaust aftertreatment system;
    wherein the electronic aftertreatment controller includes means for detecting an outgas slip event precondition;
    the exhaust control signal is responsive to a detection of the outgas slip event precondition;
    wherein the outgas slip event precondition is a reductant slip event precondition;
    the exhaust control signal includes a NOx output increase request;
    wherein the exhaust aftertreatment system includes in series a diesel particulate filter, the electronically controlled reductant delivery system and a NOx reduction catalyst, and further including a temperature sensor adjacent an outlet of the diesel particulate filter, an engine out NOx sensor, and a SCR out NOx sensor; and
    the means for detecting an outgas slip event precondition includes means for comparing a temperature of engine exhaust upstream from a NOx reduction reaction location in an exhaust system to a predetermined temperature; means for determining whether a time rate of change of a temperature of engine exhaust upstream from a NOx reduction reaction location has exceeded a predetermined temperature change rate for a predetermined duration; means for comparing the time rate of change of a determined reductant density to a predetermined density change rate; and means for determining whether the time rate of change of the determined reductant density is positive and the determined reductant density is greater than a predetermined density.

* * * * *